W. A. JOHNSTON, A. W. BROWNE & F. L. WALLACE.
NASAL INHALER.
APPLICATION FILED MAY 3, 1912.

1,081,745.

Patented Dec. 16, 1913.
4 SHEETS—SHEET 2.

WITNESSES
Clifton C. Caldwell
William J. Russell

INVENTORS
William A. Johnston
Arthur W. Browne
Frederick L. Wallace
BY Edward F. Simpson, Jr.
ATTORNEY

UNITED STATES PATENT OFFICE.

WILLIAM A. JOHNSTON AND ARTHUR W. BROWNE, OF PRINCE BAY, NEW YORK, AND FREDERICK L. WALLACE, OF LANSDOWNE, PENNSYLVANIA, ASSIGNORS TO THE S. S. WHITE DENTAL MANUFACTURING COMPANY, OF PHILADELPHIA, PENNSYLVANIA, A CORPORATION OF PENNSYLVANIA.

NASAL INHALER.

1,081,745.  Specification of Letters Patent.  Patented Dec. 16, 1913.

Application filed May 3, 1912. Serial No. 694,904.

*To all whom it may concern:*

Be it known that we, WILLIAM A. JOHNSTON and ARTHUR W. BROWNE, residing in Prince Bay, county of Richmond, State of New York, and FREDERICK L. WALLACE, residing in Lansdowne, county of Delaware, State of Pennsylvania, citizens of the United States, have invented certain new and useful Improvements in Nasal Inhalers, of which the following is a specification.

Our invention relates to improvements in nasal inhalers. In the construction of devices of this character it is desirable and essential that they be so constructed as to be readily and accurately adjusted with respect to the nose and also that means be provided by which the direction of the flow of the gases alone or of the gases combined with air, which are inhaled and exhaled by the patient, may be controlled at will. It is also desirable and essential that means be provided for adjusting and controlling the relative proportions of the gases and the air in case it is desired to permit the patient to receive a certain amount of air simultaneously with the gases which are administered.

By adjusting the devices which control the passage of the gases to and from the respiratory organs of the patient we are enabled to control the degree of anesthetization, producing either profound anesthesia or a condition of analgesia.

Accordingly, therefore, our invention has for one of its objects to provide an improved construction of means for adjusting the nose piece to cause it to fit accurately and closely around and upon the nose so as to prevent the passage of air underneath its edges.

Another object of our invention is to provide an improvement in the mechanism for controlling the passage of the gases from their source or sources of supply to the nose piece, the said mechanism also being constructed in such manner as to control the passage of outside air into and from the device surrounding the nose.

A still further object of our invention is to provide an improvement in the means for supporting the device or apparatus upon the head of the patient during the period of administration of the gases to such patient.

Other objects and advantages of our invention will be set forth in the detailed description of our invention which follows or will be apparent therefrom.

In order that our invention may be fully understood and comprehended, we have illustrated in the accompanying drawings one form of a convenient embodiment of the same, but it is to be understood that changes in the details of construction and arrangement of the parts may be varied within the scope of the claims without departing from our invention.

In the drawings, 1 designates a flexible and resilient head band which when in position upon the head extends centrally thereof from front to rear. The said band is provided with pneumatic pads 2 and 2ª which are supported upon the opposite ends of transversely extending supporting plates 3 one of which is connected directly to the forward end of the band 1 while the other is connected to a plate 4 which has slidable connection with the rear end of the head band 1. In connecting the plate 4 with the rear end of the band 1, we provide the end of the former with a slotted bar 5 through which the end of the band 1 extends and the end of the latter is provided with a similar slotted bar 7 through which the member 4 extends. It will be seen that the plate 4 may be moved longitudinally with respect to the band 1 in order to vary the position of the rear pads 2ª. The stop 6 located on the head band 1 limits the longitudinal movement of the plate 4. The pneumatic pads consist of hollow rubber parts which are adapted to be slid over the opposite ends of the transverse supporting plates 3, as is clearly shown in the drawings, particularly Figs. 6, 7 and 8. It will be noted that the outer sides of the pads are provided with openings 8 which when the pads are in position register with openings 9 in the opposite ends of the transverse supporting plates 3. The inner bearing sides of the pads are of the shape of the segments of spheres and being separated from the plates 3 constitute yielding parts to rest against the front and back portions of the head of the patient. In order to secure these pads upon the opposite ends of the plates 3 we provide the edges of the latter at points adjacent to the band 1 and plate 4 with notches 10 into which projections 11 extending inwardly from the opposite corners of the open ends of the said pads fit, as shown best in Fig. 7 of the drawings.

A resilient spring plate 12 is secured to the head band at a point intermediate its ends somewhat nearer the front than the rear end thereof. The forward end of the plate 12 is provided with a perforation 13 through which a flanged stud 14 projects. Adjustable arms 16 are pivoted upon the said stud, being secured thereon by means of a headed screw and washer 17. By properly proportioning the relation of the length of the stud to the thinness of the upper ends of the arms 16 provision may be made for clamping the arms in position with such degree of tightness as may be desired. It will, of course, be understood that the arms 16 may be connected to the plate 12 in any other manner which may be preferred by the manufacturer.

Figure 1:
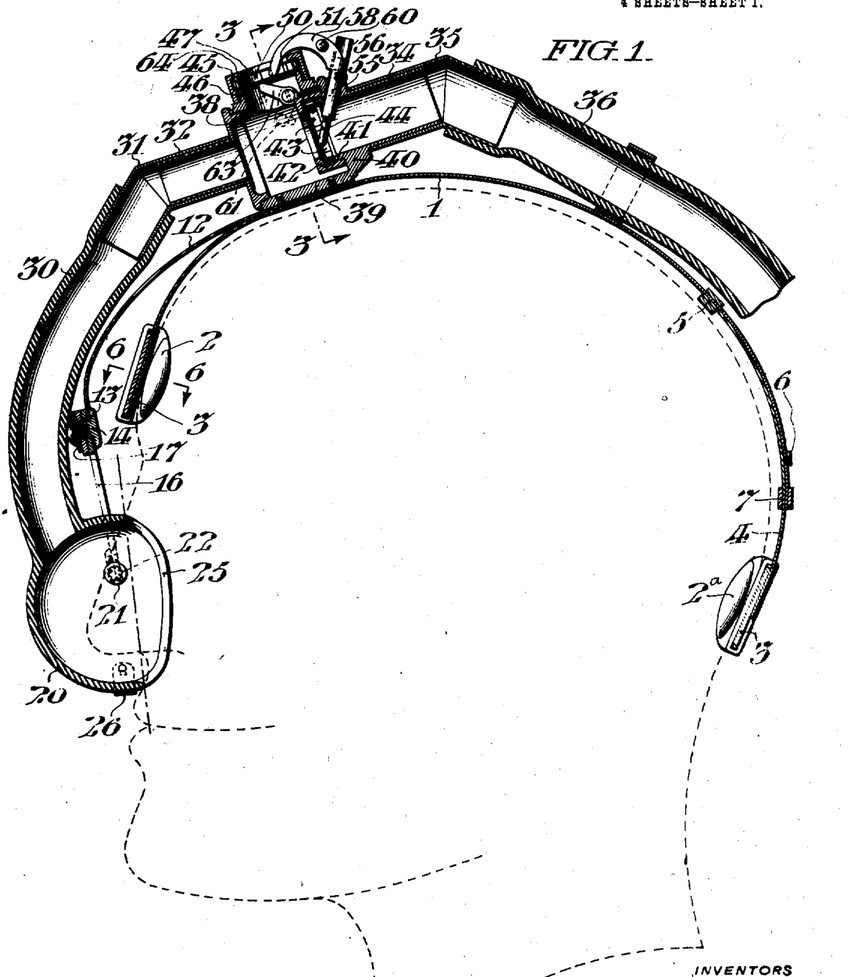
Figure 1 is a longitudinal section of a nasal inhaler embodying our invention.
Figure 15:
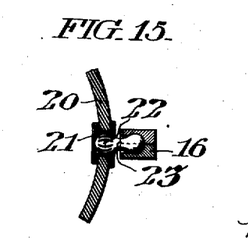
Fig. 15 is a sectional view taken on the line 15—15 of Fig. 9.

20 designates a nose piece which is secured to and supported upon the lower ends of the arms 16. The connection between the said arms and the said nose piece is effected by the construction illustrated in Fig. 15 in which the opposite sides of the nose piece 20 are provided with sockets 21 which are adapted to receive the spring ball parts 22 of the members 23 which have swivel connection with the lower ends of the said arms 16. The nose piece 20 is hollow and its rear side is provided with an opening 25, as illustrated, of triangular shape and contour corresponding to the shape and contour of the outline of what may be termed the basal portion of the nose. The portion of the said nose piece situated at the apex of the said opening is adapted to contact with the crest of the nose. The relation of such point of contact to the length of the nose may vary with noses of different shapes and lengths. The lower side of the nose piece constituting the base line or edge of the triangular opening 25 is adapted to contact with the upper lip of the patient while the sides of the said nose piece constituting the side edges of the said opening 25 contact with the opposite sides of the nose as is shown in Fig. 1 of the drawings.

Figure 9:
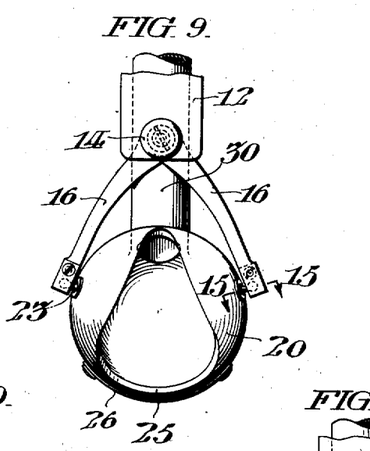
Fig. 9 is a view of the rear side of the nose piece and adjusting devices associated therewith.
Figure 10:
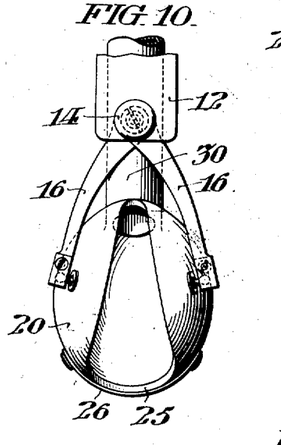
Fig. 10 is a similar view with the adjusting devices in different position from what is shown in Fig. 9.

In applying the nose piece to a wide, flat nose, it may be necessary to widen and at the same time shorten the opening 25. This may be effected by moving the arms 16 about the pivot on which they are supported to separate them. The said arms are shown in separated position in Fig. 9 of the drawings. On the other hand, it may be that in applying the nose piece to a nose say of Roman shape it would become necessary to elongate the opening 25, changing the said opening from the shape shown in Fig. 9 to that shown in Fig. 10. This change in shape may be effected by moving the arms 16 toward each other thus causing movement of the side edges of the opening 25 toward each other.

Figure 11:
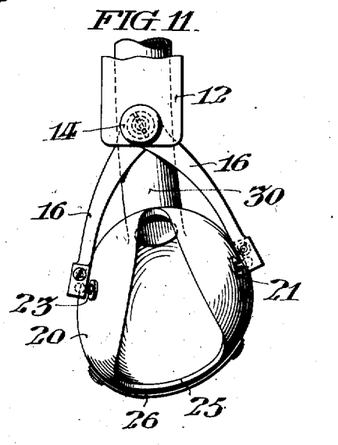
Fig. 11 is a similar view of the adjusting devices in still another position.

It is frequently, if not generally the case, that the nose is not of symmetrical shape. One side may be thicker perhaps than the other or may have a slight protuberance which may not be apparent to the eye but sufficient to prevent the complete closure of the space between one side or the other of the nose and the corresponding edge of the opening 25. Or it may be that the nose is crooked, whereby adjustment of the nose piece is required to cause the same to fit closely. In such cases it is essential that means be provided for adjusting the nose piece so as to completely close the same about the nose. As one means for effecting this result the arms 16 are employed by moving the said arms about their pivot, as is illustrated in Fig. 11, the nose piece may be also moved in a corresponding direction, and by such means either side edge of the opening 25 brought into contact with the adjacent side of the nose, thus closing any opening which may have existed between the nose and the side edge of the said opening. It will be seen, therefore, that by adjusting both of the said arms or either one of them the outline of the opening 25 may be changed to any shape desired and such opening thus be made to fit closely and accurately noses of any and all shapes and sizes. In cases where it is desired to operate upon the upper gum at the front of the mouth, it is desirable that means be provided for holding the lower edge of the said nose piece as close as is practicable to the lower end of the nose so as to leave the upper lip free to be turned upward away from the gum, thereby permitting access to the latter for the purpose of doing whatever work may be necessary. In order to accomplish this result and purpose, we have provided the flexible strip 26 which may be of considerable curvature, as is illustrated for instance in Fig. 10 of the drawings, or on the other hand when it is desired to position the lower end of the nose piece close up against the lower end of the nose the said strip may be flattened as shown at 27 in Fig. 12 of the drawings. The importance of this feature of construction will be apparent to those familiar with operations within the oral cavity who will recognize the necessity of having means provided which will enable the lifting of the upper lip out of the way when it is desired to perform some work upon the upper gum at the front part of the mouth. The said nose piece is also provided with a flexible rubber tube 30 which, as illustrated, is integral therewith. However, it will be understood that the said tube may be made separately from and secured in any convenient and practicable manner to the said nose piece. The said flexible tube is provided for the purpose of conducting the gases or a mixture of gases and air to the hollow chamber of the nose piece 20 there to be delivered to the respiratory organs of the patient.

The upper end of the flexible tube is engaged with the outer end of a short angular pipe 31 which is slidably and rotatably supported upon a short nipple 32 which projects from one end of the valve casing which is secured and supported upon the head band 1. The pipe 31 may be moved either outwardly or inwardly upon the nipple 32. Such movement is very important in that it causes outward or inward movement of the flexible tube 30 which movement is transmitted to the upper part of the nose piece 20 so as to move the same out or in, that is, away from or toward the nose. It frequently happens that owing to the fact that the noses of different patients are of different heights it becomes necessary to adjust the upper edge of the opening 25 away from or toward the face of the patient either for the purpose of moving the upper edge of such opening away from the nose to relieve the pressure of the nose piece against the same or for the purpose of moving the upper edge of said opening against the nose.

In Fig. 1 we have illustrated the pipe 31 as occupying its extreme inward position upon the nipple 32 in which position the upper part of the nose piece 20 occupies its extreme position to the right, that is, toward the face of the patient. To show more clearly the position of the upper edge of the opening 25 we have drawn in Fig. 1 a dash and dot line in position to touch the upper and lower edges of the said opening 25. It will be seen that said dash and dot line extends at a considerable angle to the plane of the arms 16.

Figures 12, 13, 14:
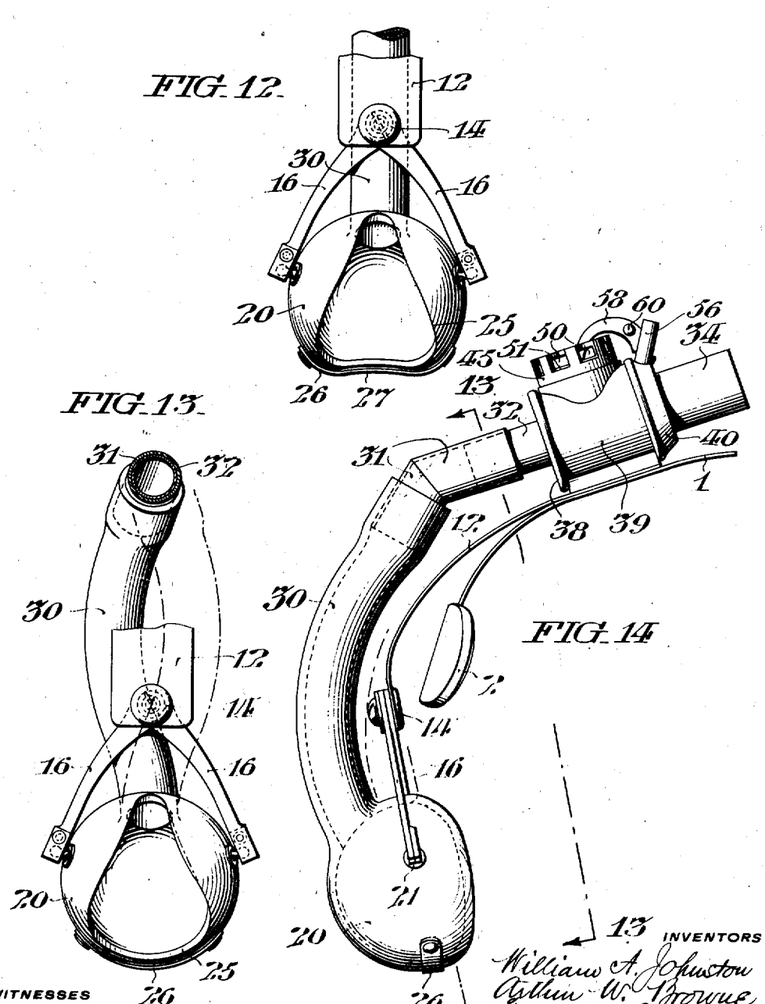
Fig. 12 is a view similar to the view shown in Figs. 9, 10 and 11 showing a still further adjustment of the nose piece.
Fig. 13 is a view taken on the line 13—13 of Fig. 14, a portion of the device removed and another portion broken away, and showing by full and dot and dash lines the nose piece adjusted to different positions.
Fig. 14 is a fragmentary side elevation of the forward portion of the inhaler showing the means whereby the nose piece may be adjustably oscillated in a vertical or longitudinal plane.

In Fig. 14 we have illustrated the pipe 31 as having been moved outwardly upon the nipple 32 and have similarly drawn a dash and dot line touching the upper and lower edges of the opening 25 in the nose piece 20. As will be noted such line is very nearly parallel with the plane of the arms 16 and if not parallel with the plane of the arms 16 the plane of such arms and does not diverge therefrom, as is clearly the case in Fig. 1. By reason of the angularity of the pipe 31, if it is turned upon the nipple 32, the outer end thereof to which the upper end of the flexible tube 30 is connected moves through the arc of a circle so as to move the said flexible tube in one direction or the other to opposite sides of a central vertical plane through the device as is clearly shown by full and dot and dash lines in Fig. 13 of the drawings. This is an important feature of construction in that it affords an additional means of adjusting the nose piece so as to cause it to fit more perfectly the nose of a patient. If after the nose piece is fitted upon the nose of the patient and the device is in operation it be found that air is entering the nose piece, say at the right hand side of the nose, the outer angular end of the pipe 31 may be turned to the left causing movement of the flexible tube 30 toward the left as shown in full lines in Fig. 13 and thus causing a slight movement of the right hand edge of the opening 25 toward the left to bring the same in closer contact with the right hand side of the nose. On the other hand if the air is found to be entering the nose piece at the left hand side of the nose the said angular pipe 31 is turned in the opposite direction so as to move the flexible tube 30 into the position shown in dot and dash lines in Fig. 13 to thereby cause slight movement of the left hand edge of the opening 25 toward the right to bring the same into close contact with the left hand side of the nose. The movements of the upper portion of the nose piece and the opposite side edges of the opening 25 by this adjusting means is indicated in dot and dash line in Fig. 13. At the end of the valve casing, opposite the nipple 32, we provide a short nipple 34 with which is engaged one end of an angular pipe 35, the other outer end of which extends into the expanded end of a tube 36 which is connected to a source (not shown) of anesthetic.

The purpose of connecting the tube 36 to a separable angular pipe 35 is that such pipe may be disconnected from the valve casing and the mechanism associated therewith for the purpose of connecting the pipe with the said tube, and thus avoid the danger of causing injury to any of the parts of the valve mechanism by rough handling while making connection between the pipe 35 and the tube 36. After the said pipe 35 and the tube 36 are connected the former may be placed in position upon the nipple 34.

The valve casing comprises the end portion 38 which has screw-threaded connection with the cylindrical member 39. The opposite end of the cylindrical member 39 is provided with a reduced integral portion 40 having an inwardly projecting screw-threaded flange 41 forming a valve seat, to which a cap 42 is detachably connected. The sides of the said cap are provided with openings 43 at intervals for a purpose to be hereinafter described. 44 designates a check valve located in the said cap and which is adapted to reciprocate between the top of the said cap and the valve seat at the end of the screw-threaded projecting flange 41. 45 also designates a cap having screw-threaded connection with a circular flange 46 extending upwardly from the cylindrical part 39 of the casing. The cap 46 is provided with a central opening 47. The side of the cap 45 is provided with openings 50 at intervals for the purpose of permitting air to enter the valve casing when desired and also for permitting the outward passage of exhaled gases.

51 designates a check valve situated inside of the cap 45 and adapted to reciprocate between the top of the said cap and the valve seat at the top of the circular flange projecting upwardly from the cylindrical member 39.

For the purpose of controlling the position and the movements of the check valves 44 and 51 we have provided the valve controlling device consisting of the longitudinally movable member 55 which is supported in the bearing 56 situated at one end of the cylindrical member 39 of the valve casing. The inner end of the said member 55 is adapted to engage the check valve 44 and cause movement thereof toward the bottom or head of the cap 42. To the upper or outer end of the longitudinally movable member 55 we connect the bent, laterally projecting part 58, the end of which enters the opening 47 in the cap 45 and contacts or is adapted to contact with the check valve 51. To provide for conveniently moving the member 55 and the part 58 connected thereto we provide upon the latter the finger pieces 60. When the member 55 and the part 58 carried thereby are pulled out or moved upwardly and it is desired to hold the check valve 51 in elevated position so that it is located in a plane above the lower ends of the openings 50 which are formed at intervals in the side of the cap 45 the crank 61 is turned to the right (see Fig. 2) which causes rotative movement of the shaft 62 upon which the said crank is mounted and the latter in turn causes upward movement of the lifting finger 63 which contacts with the check valve 51 to raise and hold the same out of contact with its seat as above stated. The distance to which the valve 51 is raised depends upon the amount of rotation of the shaft 62, and the position of such valve with respect to the openings 50 in the circular wall of the cap 45 controls and determines the amount of air which is permitted to enter the chamber of the valve casing and thus controls the amount of air which is mixed with the gases to be delivered to the patient. The tops of the caps 42 and 45 are provided respectively with small projections 64 which prevent the seating of the valves flat against the said tops.

The operation of the device, that is, whether the patient breathes to and fro through the tubes 30, 36 and the valve casing to the anesthetic or the like contained in the bag, or other source of supply, or whether the patient inhales the anesthetic from such supply and exhales through the valve opening in the cap 45 to the open air, or whether the patient breathes a mixture of anesthetic from the bag containing the same with a certain amount of air admitted from the outside through the valve opening in the cap 45 depends upon the position to which the valves in the valve casing have been adjusted. If the valve controlling device consisting of the parts 55 and 58 occupies the position shown in Figs. 1 and 2 the patient then breathes to and fro through the tubes 30, 36 and the valve casing to the bag containing the anesthetic. In such case it will be understood that the oxygen required by the patient during the administration of the anesthetic will be supplied by having been previously mixed with the anesthetic or by supplying the same to the anesthetic and admixing the two simultaneously with the administration of the latter. When the valve controlling device and the lifting finger 63 are in the positions illustrated in Fig. 4 of the drawings, the patient will inhale the anesthetic from a bag or other source of supply but will exhale the same to the open air.

Figures 2, 3, 4, 5, 6, 7, 8:
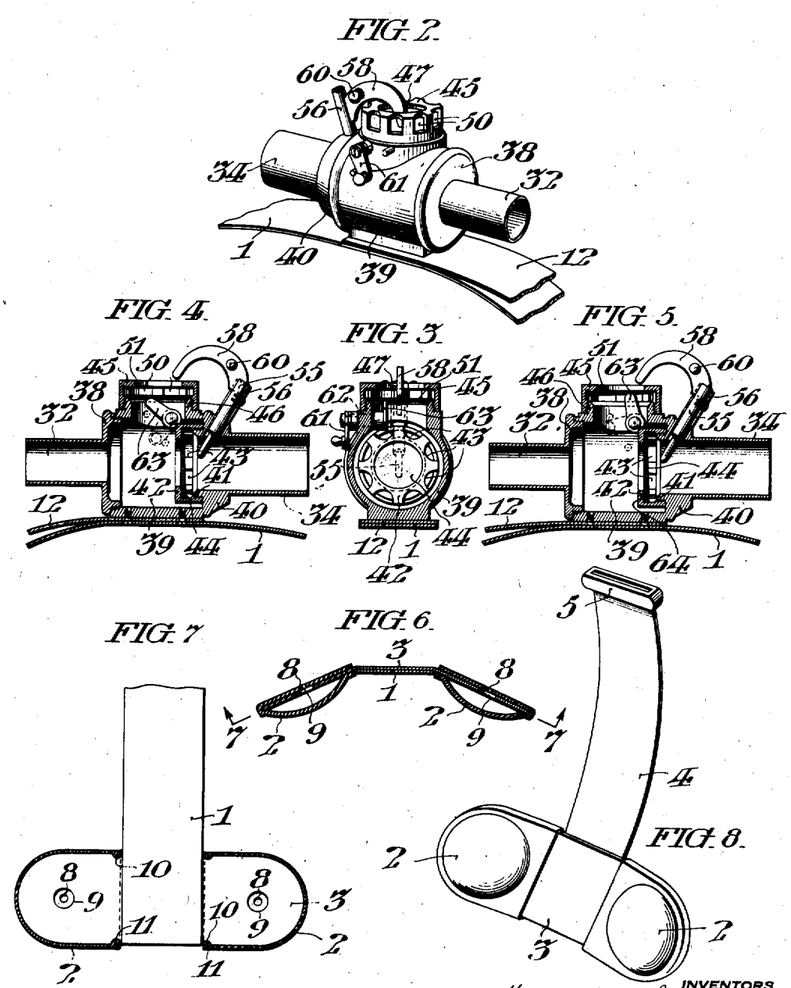
Fig. 2 is a perspective view of the valve casing and certain of the parts of the device embodying our invention associated therewith, portions of the said device being removed or broken away.
Fig. 3 is a transverse section on the line 3—3 of Fig. 1.
Fig. 4 is a vertical longitudinal section of the device shown in Fig. 2 with one of the parts in different position from that in which it is illustrated in Fig. 2.
Fig. 5 is a view similar to Fig. 4 certain of the parts being, however, in different relative positions with respect to each other.
Fig. 6 is a transverse section on the line 6—6 of Fig. 1.
Fig. 7 is a transverse section on the line 7—7 of Fig. 6.
Fig. 8 is a perspective view showing an element carrying certain of the pads which are adapted to contact with the head of the patient.

When the parts are in the position illustrated in Fig. 4 it is clear that when the patient inhales the valve 44 will move away from its seat and permit the passage of anesthetic from any source or sources of supply through the valve casing to the patient, while simultaneously the valve 51 is resting upon its seat and prevents the entry of outside air. When the patient exhales, however, the valve 44 moves to the right against its seat while the valve 51 is lifted from its seat so that the exhaled gases pass out into the open air. When the valve controlling device 55 and 58 and the finger 63 are in the positions indicated in Fig. 5, in which the valve 51 is held away from its seat, the patient breathes a mixture of the anesthetic and air, the anesthetic entering through openings 43 in the circular wall of the cap 42, and the air entering through the openings 50 in the circular wall of the cap 45 and exhales through the openings in the cap 45 to the outside air. When it is desired to produce an analgesic anesthesia for the purpose of performing minor dental operations, the valve controlling parts including the finger 63 are adjusted to the positions indicated in Fig. 5. When, however, it is desired to perform more serious operations, the valve controlling parts are adjusted so as to cause the patient to breathe either to and fro from the bag or other receptacle containing the anesthetic or to inhale the anesthetic without a mixture of air and exhale to the open air. It will be understood, of course, that the valve controlling members 55 and 58 and the finger 63 may be adjusted to positions intermediate those illustrated in the drawings so that the relative proportions of gases and the air may be controlled with great accuracy.

Having thus described our invention, we claim:—

1. An inhaler comprising a casing having openings therein communicating respectively with a source of anesthetic and the open air, valves operative to open and close said openings, reciprocatory means operative to simultaneously open one of said valves and close the other of said valves, and pivotally operative means to open the last named valve, the said pivotal means acting independently of the said reciprocatory means.

2. An inhaler comprising a casing having openings therein communicating respectively with a source of anesthetic and with the open air, valves for controlling the said openings, and independently operable means for controlling the operation of the said valves, one of said means affecting the operation of both valves and the other of said means affecting the operation of one only of said valves.

3. An inhaler comprising a casing having openings therein communicating respectively with a source of anesthetic or the like and with the open air, valves for controlling the said openings, adjustable means which when in one position holds the valve for controlling the opening to the anesthetic in open position and the valve for controlling the opening to the air in closed position and when in another position permits both said valves to open and close, and adjustable means for supporting the valve for controlling the air opening in different positions removed from its seat to vary the quantity of air admitted to the casing.

4. An inhaler comprising a casing having openings communicating respectively with a source of anesthetic and with the open air, valves for controlling the said openings, means for permitting the valve which controls the opening in communication with the said anesthetic to open and close, and independent movable means for holding the valve which controls the opening to the open air in open position.

5. An inhaler comprising a casing having openings in communication respectively with a source of anesthetic and with the open air, reciprocating valves for controlling the said openings, reciprocating means for simultaneously adjusting the positions of said valves and pivotal means for adjusting one only of said valves.

6. An inhaler comprising a casing having openings in communication with a source of anesthetic and with the open air, means which is adapted to be adjusted to permit the opening and the closing of the said valves by the breathing of the patient, and additional means for contacting with one of the said valves to hold it in open position when the first named means is so adjusted.

7. An inhaler comprising a casing having openings in communication with a source of anesthetic and with the open air, a valve controlling device comprising a member mounted in a bearing formed on the said casing and adapted to reciprocate therein, one end of the said member being adapted to contact with one of the said valves to control the operation of the same and the said member having a laterally extending finger adapted to contact with the other of said valves to control its operation.

8. An inhaler comprising a casing having openings in communication with a source of anesthetic and with the open air, a controlling device supported in a bearing upon the said casing and adapted to be moved into and out of contact with the said valves, and means which is adapted to hold one of the said valves in open position when the said valve controlling device is moved to a position out of contact with the said valves.

9. An inhaler comprising a casing having openings in communication with a source of anesthetic and with the open air, a rotatable finger located inside the casing which is adapted to contact with one of the said valves to lift the same from its seat and hold it in open position. and manually operable means for contacting with the opposite side of said last mentioned valve to hold it in closed position.

10. An inhaler comprising a casing having openings in communication with a source of anesthetic and with the open air. reciprocating valves which control the said openings, a valve controlling device which is adapted when in one position to hold one of the said valves in closed position and the other one in open position, and the said device when in another position permitting the opening and closing of the said valves under the influence of the inhaling and exhaling action of the patient, and a rotatable finger which is adapted to contact with one of the said valves and hold it in open position.

11. An inhaler comprising a casing having openings respectively in communication with a source of anesthetic and with the open air, valves for controlling the said openings, a member adapted to be moved longitudinally to adjust one of its ends into and out of contact with one of the said valves to control its position and the said member having a finger which is adapted to be moved into and out of contact with the other of said valves to control the same, a finger situated inside of the said casing, and means for causing rotative movement thereof toward and from one of the said valves to adjust the position thereof relative to its seat.

12. An inhaler comprising a casing having openings respectively in communication with a source of anesthetic and with the open air, reciprocating valves for opening and closing the said openings, a longitudinally movable member adapted to be adjusted to cause one end thereof to be moved into and out of contact with the valve closing the opening which is in communication with the anesthetic or the like, a crooked finger secured to the said longitudinally movable member and adapted to be moved into and out of contact with the other of said valves to control its operation, a finger situated inside the said casing, and means for causing rotative movement of the said finger toward and away from the last mentioned valve to limit its movement in one direction.

13. An inhaler comprising a casing having openings respectively in communication with a source of anesthetic and with the open air, a valve for controlling the opening which is in communication with the said anesthetic, a valve for controlling the opening which is in communication with the open air, and adjustable means for adjusting the said valves into position to cause the patient to breathe to and fro to the said anesthetic, the said means being also adjustable into position to allow the said valves to operate to permit the passage of the anesthetic from its source of supply through the said casing when the patient inhales and to prevent the passage of exhaled gases from the said casing toward the anesthetic when the patient exhales, the exhaled gases being permitted to pass through the open air opening.

14. An inhaler comprising a casing having valve controlled openings in communication with an anesthetic and with the open air and also having an opening in communication with a nose piece, the said casing having nipples the openings of which constitute continuations of the openings in the casing which are in communication respectively with the anesthetic and with the said nose piece, bent pipes in detachable engagement with the said nipples, and tubes detachably connected with the said bent pipes.

15. A nasal inhaler comprising a chambered nose piece having an opening in the rear side thereof and pivotal means for adjusting the said nose piece laterally in either direction.

16. A nasal inhaler comprising a chambered nose piece having an opening in the rear side thereof through which the nose of a patient projects, pivoted members having connection with the said nose piece for adjusting the same laterally in either direction, and means for supporting the said pivoted members.

17. A nasal inhaler comprising a chambered nose piece having an opening in its rear side to receive the nose of a patient, pivoted members which diverge from their pivot to opposite sides of the said nose piece to which the said members are connected, adjustment of the said members causing adjustment of the said nose piece, and means for supporting the said members.

18. A nasal inhaler comprising a chambered nose piece having an opening in its rear side to receive the nose, and means for adjusting the opposite sides of the said nose piece toward or from each other to thereby vary the shape of the said opening.

19. A nasal inhaler comprising a chambered nose piece having an opening to receive the nose of a patient, the edges of the said nose piece around the said opening fitting over the nose as described, means by which the said nose piece is supported the said means being adjustable to cause adjustment of the said nose piece so that it may be made to fit noses of different shapes and sizes.

20. A nasal inhaler comprising a chambered nose piece having an opening in its rear side to receive the nose of a patient, concentrically pivoted arms the lower ends of which have connection with the said nose piece, the said arms being adjustable for causing adjustments of the said nose piece, and means for supporting the said arms.

21. In a nasal inhaler, the combination of a head band, a nose piece for fitting over the nose of a patient, the said nose piece having a universal joint connection with the said head band.

22. In a nasal inhaler, the combination of a head band, a nose piece adapted to fit over the nose of a patient, means for supplying an anesthetic to the said nose piece, arms having pivotal connection with the said nose piece, the axis of the said pivots extending substantially at right angles to a central vertical plane through the nose of a patient, the said arms having pivotal operative connection with the said head band whereby the said nose piece may be adjusted laterally in either direction and toward and away from the nose of a patient.

23. A nasal inhaler comprising a chambered nose piece which is adapted to fit over the nose of a patient, means for supplying an anesthetic to the chamber of the said nose piece, and means secured to the lower end of the said nose piece for adjusting the same toward and from the end of the nose when in position over the nose.

24. A nasal inhaler comprising a chambered nose piece having a triangular opening in its rear side to receive the nose of a patient, a flexible member secured to the said nose piece adjacent to the base of the said triangular opening, the said flexible member being adapted to be bent to adjust the position of the edge of the said opening at its base with respect to the end of the nose.

25. A nasal inhaler comprising a chambered nose piece having a tube connected therewith for supplying anesthetics thereto to be breathed by the patient and the said nose piece having a triangular opening in its rear side through which the nose of the patient projects, the apex of the said opening being adapted to rest upon the crest of the patient's nose while the basal edge thereof is adapted to rest against the upper lip of the patient, means for adjusting the side edges of the said opening toward and from each other to cause the same to contact with the sides of the nose, and means for adjusting the basal edge of the said triangular opening toward and from its apex and maintaining the same in the position to which it may be adjusted.

26. A nasal inhaler comprising a chambered nose piece having an opening in its rear side to receive the nose of a patient, the lower end of the said nose piece adjacent to said opening being adjustable in a vertical plane toward and from the nose of the patient, and means for holding the said lower end in adjusted position.

27. A nasal inhaler comprising a pivotally supported nose piece, a rotatable bent pipe, a tube for the passage of anesthetics having connection with the said nose piece and with one end of the said pipe, and a support for the said pipe and the said pipe being adapted to be rotated upon its support to cause movement of its outer end to which said tube is connected in the arc of a circle in opposite directions to cause lateral adjustment of the said nose piece whereby it may be fitted accurately to either side of the nose of a patient.

28. In a nasal inhaler the combination of a valve casing, nipples extending in opposite directions from said casing, a tube having connection with one of the said nipples and with a source of anesthetic, a pipe having rotatable connection with the other of said nipples, the outer end of said pipe being extended at an angle to the portion thereof upon the said nipple, a chambered nose piece adapted to fit over the nose of a patient, a flexible tube extending from the said nose piece to the said pipe and having connection with the outer angular end thereof and the said nose piece being adapted to be adjusted laterally in either direction by causing rotative movement of the said pipe in either direction upon the said nipple.

29. In a nasal inhaler, the combination of a chambered nose piece adapted to fit over the nose of a patient, a tube leading from the said nose piece, a longitudinally adjustable pipe to which said tube is connected, and a support for the said pipe, the longitudinal adjustment of the said pipe causing adjustment of the upper part of the nose piece toward and from the nose of a patient.

30. In a nasal inhaler, the combination of a chambered nose piece having a flexible tube extending therefrom, an angular pipe to which the said tube is connected, a support to which one end of the said pipe is connected, the said pipe being rotatably and longitudinally adjustable, such longitudinal adjustments causing adjustments of the said nose piece in a vertical plane toward and from the nose of a patient and the rotatable adjustments causing lateral adjustment of the said nose piece.

31. In a nasal inhaler, the combination of a head band adapted to be clamped upon the head of a patient, which band extends from front to rear over the head, a nose piece, means for supplying gases to such nose piece, and adjusting devices having connection with the said head band and with the opposite sides of said nose piece for adjusting the latter.

32. In a nasal inhaler, the combination of a head band, a nose piece having an opening therein to receive the nose of a patient, a valve casing supported upon the said head band, a tubular connection between the said valve casing and the said nose piece for supplying anesthetics to the said nose piece, means for controlling the passage of gases through the said valve casing, and adjustable supporting means connected to the opposite sides of said nose piece, the parts of the said supporting means connected to the said opposite sides being relatively adjustable toward and from each other.

33. In a nasal inhaler, the combination of a head band having pads at its opposite ends adapted to rest against the head of a patient, a supporting plate connected to the said head band and projecting above and forwardly from the same, a nose piece, and arms connecting the opposite sides of the same with the said plate whereby the said nose piece is supported in position over the nose of a patient.

34. An inhaler comprising a head band for supporting the same, the said head band being provided at its opposite ends with pads, supports for the said pads, the said supports having holes therethrough and the outer sides of the said pads being provided with perforations registering with the holes in the said supports and the inner bearing 30 sides of the said pads being projected away from the said support to form yielding bearings to rest against the head of a patient.

35. A nasal inhaler having a head band by means of which it is supported upon the head of a patient, the said head band having cross-wise extending plates connected to its opposite ends, the said plates having notches formed in their opposite edges and also having holes extending through their opposite end portions, pads adapted to fit over 40 the opposite ends of the said plates, the said pads having at their opposite corners inwardly extending projections which are adapted to fit into the said notches to secure the said pads in place upon the said plates, and the rear sides of the said pads having perforations therein registering with the holes in the said plates, and the inner bearing side of the said pads being separated from the said plates whereby such bearing 50 sides are yielding.

36. An inhaler comprising a casing having openings therein communicating respectively with a source of anesthetic and the open air, valves operative to open and close 55 said openings, reciprocatory means operative to simultaneously open one of said valves and close the other of said valves, and movable means operable to open the last-named valve.

In testimony that we claim the foregoing as our invention, we have hereunto signed our names this 29th day of April, 1912.

WILLIAM A. JOHNSTON.
ARTHUR W. BROWNE.
FREDERICK L. WALLACE.

In the presence of—
ROBERT C. ANGELL,
ALBERT A. SIEVERS.

---

Correction in Letters Patent No. 1,081,745.

It is hereby certified that in Letters Patent No. 1,081,745, granted December 16, 1913, upon the application of William A. Johnston and Arthur W. Browne, of Prince Bay, New York, and Frederick L. Wallace, of Landsdowne, Pennsylvania, for an improvement in "Nasal Inhalers", an error appears in the printed specification requiring correction as follows: Page 3, line 90, strike out the words " with the plane of the arms 16 " and insert the words *therewith converges toward;* and that the said Letters Patent should be read with this correction therein that the same may conform to the record of the case in the Patent Office.

Signed and sealed this 13th day of January, A. D., 1914.

[SEAL.]

J. T. NEWTON,

*Acting Commissioner of Patents.* valve casing supported upon the said head band, a tubular connection between the said valve casing and the said nose piece for supplying anesthetics to the said nose piece, means for controlling the passage of gases through the said valve casing, and adjustable supporting means connected to the opposite sides of said nose piece, the parts of the said supporting means connected to the said opposite sides being relatively adjustable toward and from each other.

33. In a nasal inhaler, the combination of a head band having pads at its opposite ends adapted to rest against the head of a patient, a supporting plate connected to the said head band and projecting above and forwardly from the same, a nose piece, and arms connecting the opposite sides of the same with the said plate whereby the said nose piece is supported in position over the nose of a patient.

34. An inhaler comprising a head band for supporting the same, the said head band being provided at its opposite ends with pads, supports for the said pads, the said supports having holes therethrough and the outer sides of the said pads being provided with perforations registering with the holes in the said supports and the inner bearing 30 sides of the said pads being projected away from the said support to form yielding bearings to rest against the head of a patient.

35. A nasal inhaler having a head band by means of which it is supported upon the head of a patient, the said head band having cross-wise extending plates connected to its opposite ends, the said plates having notches formed in their opposite edges and also having holes extending through their opposite end portions, pads adapted to fit over 40 the opposite ends of the said plates, the said pads having at their opposite corners inwardly extending projections which are adapted to fit into the said notches to secure the said pads in place upon the said plates, and the rear sides of the said pads having perforations therein registering with the holes in the said plates, and the inner bearing side of the said pads being separated from the said plates whereby such bearing 50 sides are yielding.

36. An inhaler comprising a casing having openings therein communicating respectively with a source of anesthetic and the open air, valves operative to open and close 55 said openings, reciprocatory means operative to simultaneously open one of said valves and close the other of said valves, and movable means operable to open the last-named valve.

In testimony that we claim the foregoing as our invention, we have hereunto signed our names this 29th day of April, 1912.

WILLIAM A. JOHNSTON.
ARTHUR W. BROWNE.
FREDERICK L. WALLACE.

In the presence of—
ROBERT C. ANGELL,
ALBERT A. SIEVERS.

---

Correction in Letters Patent No. 1,081,745.

It is hereby certified that in Letters Patent No. 1,081,745, granted December 16, 1913, upon the application of William A. Johnston and Arthur W. Browne, of Prince Bay, New York, and Frederick L. Wallace, of Landsdowne, Pennsylvania, for an improvement in "Nasal Inhalers", an error appears in the printed specification requiring correction as follows: Page 3, line 90, strike out the words "with the plane of the arms 16" and insert the words *therewith converges toward;* and that the said Letters Patent should be read with this correction therein that the same may conform to the record of the case in the Patent Office.

Signed and sealed this 13th day of January, A. D., 1914.

[SEAL.]

J. T. NEWTON,

*Acting Commissioner of Patents.*

Correction in Letters Patent No. 1,081,745.

It is hereby certified that in Letters Patent No. 1,081,745, granted December 16, 1913, upon the application of William A. Johnston and Arthur W. Browne, of Prince Bay, New York, and Frederick L. Wallace, of Landsdowne, Pennsylvania, for an improvement in "Nasal Inhalers", an error appears in the printed specification requiring correction as follows: Page 3, line 90, strike out the words " with the plane of the arms 16 " and insert the words *therewith converges toward;* and that the said Letters Patent should be read with this correction therein that the same may conform to the record of the case in the Patent Office.

Signed and sealed this 13th day of January, A. D., 1914.

[SEAL.]

J. T. NEWTON,
*Acting Commissioner of Patents.*